United States Patent
Rowe et al.

(10) Patent No.: US 7,620,948 B1
(45) Date of Patent: Nov. 17, 2009

(54) CLIENT SIDE SOFTWARE UPDATING

(75) Inventors: Edward R. W. Rowe, Sunnyvale, CA (US); Phillip Ydens, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 570 days.

(21) Appl. No.: 10/651,697

(22) Filed: Aug. 29, 2003

(51) Int. Cl.
*G06F 9/45* (2006.01)

(52) U.S. Cl. ........................................ 717/171

(58) Field of Classification Search ......... 717/168–178
See application file for complete search history.

(56) References Cited

U.S. PATENT DOCUMENTS

| | | | | |
|---|---|---|---|---|
| 4,558,413 A | * | 12/1985 | Schmidt et al. | 717/171 |
| 4,674,055 A | * | 6/1987 | Ogaki et al. | 700/234 |
| 5,155,847 A | * | 10/1992 | Kirouac et al. | 717/170 |
| 5,421,009 A | * | 5/1995 | Platt | 709/221 |
| 5,473,772 A | * | 12/1995 | Halliwell et al. | 717/171 |
| 5,495,610 A | * | 2/1996 | Shing et al. | 709/221 |
| 5,931,909 A | * | 8/1999 | Taylor | 717/176 |
| 5,966,540 A | * | 10/1999 | Lister et al. | 717/174 |
| 6,151,643 A | * | 11/2000 | Cheng et al. | 710/36 |
| 6,904,592 B1 | * | 6/2005 | Johnson | 717/168 |
| 7,203,745 B2 | * | 4/2007 | Sheehy et al. | 717/176 |
| 2004/0243995 A1 | * | 12/2004 | Sheehy | 717/174 |
| 2004/0243996 A1 | * | 12/2004 | Sheehy et al. | 717/174 |

* cited by examiner

*Primary Examiner*—John Chavis
(74) *Attorney, Agent, or Firm*—Fish & Richardson P.C.

(57) ABSTRACT

Methods and apparatus, including computer program products, for updating software in a client environment. Update information is received in the client environment. The update information identifies one or more available software products. Update instructions are executed in the client environment to identify one or more of the available software products as suitable for the client environment. An input selecting one or more of the identified suitable software products is received in the client environment. The selected software products are retrieved and installed in the client environment. The software products can include one or more software updates.

73 Claims, 6 Drawing Sheets

CLIENT SIDE SOFTWARE UPDATING

BACKGROUND

The present invention relates to updating software.

In general, software refers to data, including instructions and/or content, that a data processing apparatus, such as a computer system, can process electronically. A software publisher typically provides software products, including updates to existing software products. An update is associated with one or more earlier versions of a software product and provides new components or modifies existing components of the software product. For example, a first version of a software product can be followed by one or more updated versions that are developed to implement new functions and/or to fix problems in earlier versions. Alternatively, e.g., as part of a business strategy, a software product can be developed in a relatively simple and affordable (or even free) basic version and updates can provide optional components, e.g., for additional charges. The optional components add extra features and/or complex functions to the basic version.

To facilitate the update process, a software product in a computer system can be associated with an updater application that can be part of the software product (either in the core or as a plugin) or a separate application. The updater is an application that requests and downloads update information, e.g., for the associated software product. The update information can be requested from one or more update servers. An update server is a server, e.g., on the Internet, that provides information for updates if requested by an update client, such as the computer system including the updater. If updates are available from the update server, the updater can present a user interface ("UI") to the user who can select from the available updates. To install the selected updates, the updater can download and execute installer applications.

Complex software products and their updates, in particular optional components, often depend on other software components or specific hardware features. For managing dependencies, some updaters collect system information (including software and/or hardware information) about the update client, and send the system information to an update server. The update server evaluates the system information, selects, and offers updates that are suitable for the update client. In addition, the update server can use the system information to identify and offer new software products that are suitable for the update client, even if the new products are unrelated or only loosely related to the software product that is being updated.

SUMMARY

An update client receives instructions for an update process and executes the instructions to request and select software products, e.g., software updates. In general, in one aspect, the invention provides methods and apparatus, including computer program products, to implement techniques for updating software in a client environment. The techniques include receiving update information in the client environment. The update information identifies one or more available software products. Update instructions are executed in the client environment to identify one or more of the available software products as suitable for the client environment. An input selecting one or more of the identified suitable software products is received in the client environment. The selected software products are retrieved to the client environment, and the retrieved software products are installed in the client environment.

Particular implementations can include one or more of the following features. Executing update instructions in the client environment to identify suitable software products can include executing instructions to evaluate the client environment. Evaluating the client environment can include identifying software or hardware installed in the client environment. When to request update information can be determined in the client environment. The update instructions can include scheduling instructions. Determining in the client environment when to request update information can include executing one or more of the scheduling instructions. Executing update instructions to identify suitable software products can include executing instructions to interpret the update information identifying the available software products. Interpreting the update information can include determining whether new update instructions are required for processing the available software products. If new update instructions are required, identifying suitable software products can include retrieving and executing the new update instructions in the client environment. Receiving an input selecting one or more of the suitable software products can include receiving user input selecting one or more of the suitable software products.

The available software products can include one or more available software updates. Executing update instructions in the client environment to identify suitable software products can include executing update instructions to identify one or more of the available software updates as suitable for software in the client environment. Receiving update information in the client environment can include receiving information indicating a version number and/or dates of last modification of each available software update. Executing update instructions to identify suitable updates can include executing instructions to identify updates of a software product installed in the client environment. Executing the instructions to identify updates of the installed software product can include executing instructions to identify updates that add optional components to the installed software product. The installed software product can have a first version number, and executing the instructions to identify updates of the installed software product can include executing instructions to identify updates that are operable to update the installed software product from the first to a second version number. The update instructions can be executed in the client environment by an updater application associated with one or more software products installed in the client environment. Executing update instructions to identify suitable updates can include executing update instructions to identify suitable updates that are unrelated to the software products associated with the updater application. Retrieving the selected software updates can include executing update instructions to identify installers for the selected software updates and retrieving the identified installers. Installing the retrieved software updates can include using the retrieved installers to install the retrieved software updates. Executing update instructions to identify installers can include executing instructions to identify a sequence of two or more installers for updating a software product, and using the retrieved installers can include executing the two or more installer applications for updating the software product in an order defined by the identified sequence. Executing update instructions to identify installers can include executing instructions to identify dependencies between installer applications for updating the software product.

Executing update instructions to identify suitable software products can include executing instructions to specify a user interface for updating software in the client environment. A representation of at least a portion of the update information can be presented to a user in the specified user interface. Retrieving the selected software products can include retrieving the selected software products as digitally signed data. One or more update instructions can be received in the client environment. Receiving update instructions can include receiving update instructions as digitally signed data. Receiving update instructions or update information in the update client can include receiving data from one or more stateless file servers. The update instructions can be cached The update instructions can be specified in a platform independent form. The update instructions can be specified in an interpreted computer language. The interpreted computer language can be JavaScript or VBScript.

In general, in another aspect, the invention provides methods and apparatus, including computer program products, for updating software in a client environment. A software update is received for a software product in a client environment. The software update includes a sequence of installer applications for updating the software product from an earlier version to a new version according to the software update. The installer applications are executed in an order defined by the sequence to update the software product from the earlier version through one or more intermediate versions to the new version in the client environment.

The invention can be implemented to realize one or more of the following advantages. By receiving and executing instructions for an update process, an update client can update a software product without sending system information to an update server and/or requiring the update server to process information during the update process. To provide secure updates, the update server can digitally sign the instructions, and the update client can check the signature. The instructions for the update process can be platform independent and executed the same way in different platforms. Because sending system information to the update server can be avoided, the update client's privacy can be better protected. The update client can make all decisions during the update process. Because server side processing can be avoided, the update server can be a simple stateless file server. The update client can manage dependencies between software components and updates without server side processing. For example, optional components can be requested and installed without server side processing. In addition, an updater can install unrelated components, i.e., software products or updates to software products that are unrelated to the software product associated with the updater. The unrelated components can be installed without server side processing. The update client can request and use a sequence of installers to update an older version of a software product. The sequence of installers can include a first installer that updates the older version to a newer version and a second installer that updates the newer version to a newest version of the software product; therefore no installer is required for updating the older version directly to the newest version. Because the update server is not required to perform instructions during the update process, the update server can serve simultaneously a large number of update clients. The update process can be customized without server side processing or installing a new updater in the update client. For example, the update server can include instructions that are operable by an update client to specify an update specific user interface or set a new schedule for future updates. By setting an appropriate schedule, the update process can be synchronized with release dates of new products, or workload can be redistributed to avoid overloading the update server during times of high demand or maintenance. The update process can be customized for a software and/or hardware environment of the update client to provide high quality user experience. Because the instructions at the update client can be customized, the update process can have a significant flexibility, e.g., in determining whether an update is required for a user. For example, an update can be provided for designated users that match one or more criteria (e.g., Windows 98 users having a particular version of Internet Explorer). Instructions in a client can customize the client to request updates from one or more particular servers and to balance load among the servers. For example, the client can receive instructions that specify how to select an appropriate update server from multiple servers. Alternatively, instructions from a busy server can redirect the client to another server for available updates.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
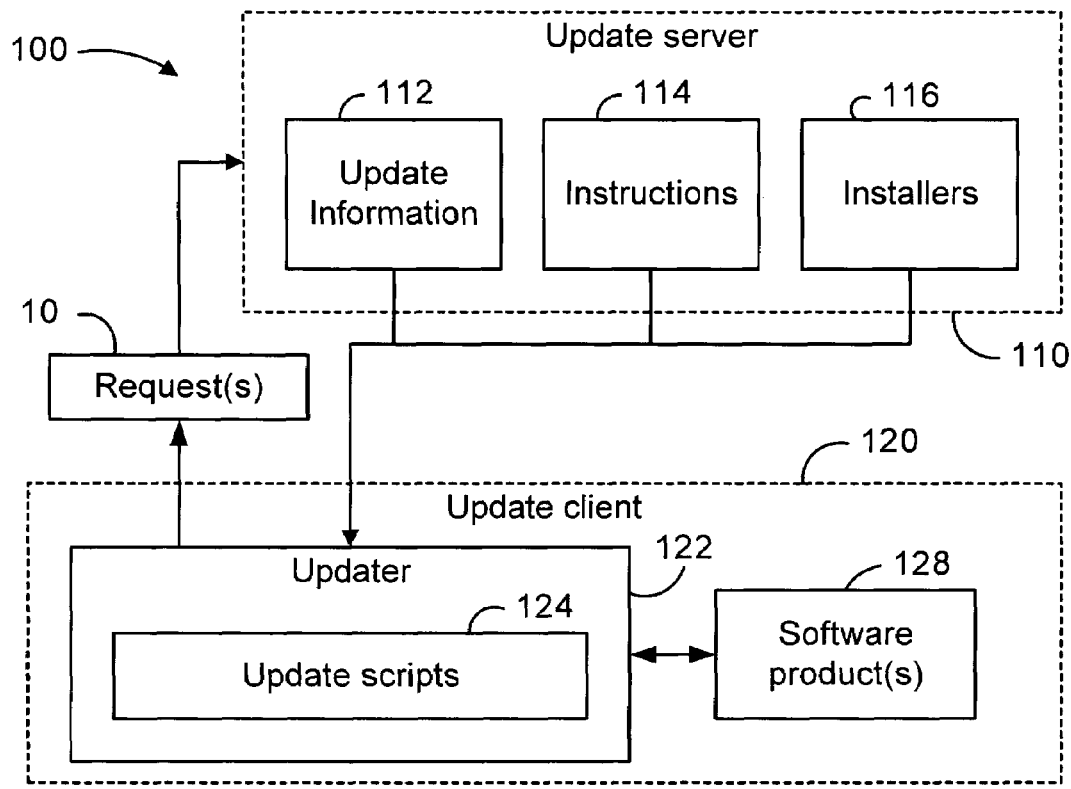
FIG. 1 is a schematic diagram showing a system for updating software.

FIG. 1 shows a system 100 for updating software. The system 100 includes an update server 110 and an update client 120. In alternative implementations, the update server 110 can serve multiple update clients. The update client 120 sends one or more requests 10 to the update server 110 during an update process. The requests 10 are requests for data related to updating software in the update client 120. The update server 110 sends the requested data to the update client 120, which uses the received data for updating software. In one implementation, the update client 120 makes all decisions of the update process, and the update server 110 provides only the data requested by the update client 120. Methods for updating software in the system 100 are discussed in detail with reference to FIGS. 3-7.

Upon request, the update server 110 provides data, including update information, to update clients. In one implementation, the update server 110 does not receive or evaluate information about client systems, does not make any decision of the update process, and does not control or monitor the update process. Therefore, the update server 110 can be implemented in a stateless server. A stateless server has no information about previous actions that involved the server. Upon request, the stateless server provides requested data without any further processing or consideration. Because no server side processing is required in this implementation, the update server 110 can simultaneously serve a large number of update clients. In alternative implementations, the update server can perform some processing during the update process.

In one implementation, the update server 110 is a file server that is available through a computer network, such as a local area network ("LAN"), or a wide area network, such as the Internet. For example, the update server can be an Internet file server using File Transfer Protocol ("FTP") or a web server using Hyper Text Transfer Protocol ("HTTP"). Optionally, the update server can be available only through secured protocols such as Secure Sockets Layer ("SSL") or Secure HTTP ("S-HTTP"). For example, the update client can choose between secured and unsecured protocols. Alternatively, the update server can be a local storage device, such as a magnetic or optical disk drive, storing and, upon request, providing data for updating software. In alternative implementations, the update server 110 can be implemented as more than one file servers. For example, the update server can include multiple Internet servers, such as web servers or FTP servers. Alternatively, a first file server can be a disk drive reading a compact disk ("CD") and a second file server can be a web server.

The update server 110 can provide update information 112, instructions 114 for updates, and update installers 116. The update information 112, the instructions 114, and the installers 116 can be on the same server or on different file servers, e.g., on different web servers. Optionally, the update server 110 can digitally sign one or more of the update information 112, the instructions 114, and the installers 116, and the update client 120 can check the signature to increase security of the update process.

The update information 112 includes information about software products, e.g., updates for one or more software products, that are available from the update server 110. For example, the update information 112 can identify all updates that are available at the update server 110. Optionally, the update information 112 can include a description of the available updates and/or information about other software products, e.g., new products released in the future.

In addition, the update information 112 can provide information that can be used by the update client 120 during an update process. For example, the update information 112 can identify, for each available updates, one or more of the installers 116 or the instructions 114. The identified instructions can include, for example, instructions for selecting and requesting an update from the update server 110, or for customizing an update schedule or a user interface in the update client 120.

In one implementation, the update information 112 includes instructions. For example, the update information 112 can explicitly include, not just identify, one or more of the instructions 114. The update information 112 can also include instructions that specify or evaluate content included in the update information 112. In one implementation, the update information 112 is cast entirely in a form of instructions, for example, as a script including instructions that can be executed by update clients.

The instructions 114 are instructions for an update process. For example, the instructions 114 can include instructions operable to request data from the update server 110, request and evaluate system information in the update client 120, and select software products, such as updates, that are suitable for the client 120. In addition, the instructions 114 can include instructions operable to request, organize, and execute installers, or customize an update schedule or a user interface for the update process in the update client 120.

The instructions 114 are executed by an update client, such as the update client 120. For example, the instructions 114 can include instructions in a high level programming language, such as Java® developed by Sun Microsystems of Mountain View, Calif., JavaScript® developed by Netscape Communications Corporation of Mountain View, Calif., or VBScript® developed by Microsoft Corporation of Bellevue, Wash. By providing instructions in a high level programming language, the update server 110 can serve update clients independent of the client platform, i.e., the software and hardware environment used by the update clients.

The installers 116 are applications and/or data for one or more applications that can be executed in an update client to install new software products and/or updates for one or more software products. For example, the installers 116 can include installer applications that can be executed in the update client, and/or data for one or more installer engines that are already present in the update client. The installers 116 can include installers that can install multiple versions of a software product and/or installers that can only be applied to a specific version of a software product. In addition, installers may depend on specific software components or hardware features in a client platform, or an update process can include executing multiple installers in a specific order. Selecting installers that are suitable for an update client and managing dependencies is discussed with reference to FIGS. 6-7.

The update client 120 requests data from the update server 110. The requested data can include update information, instructions, and installers. The update client 120 can be implemented in a single computer, such as a personal computer, or a computer system including multiple computers connected by a LAN or the Internet. For example, a first computer of the system can request update information from the update server, and install updates in one or more other computers of the system.

The update client 120 includes an updater 122 to update software in a client environment. The updater 122 can be a component of a software product or a separate application. The updater 122 can be associated with one or more software products 128, such as system software, one or more applications, or documents in the update client 120. In alternative implementations, the updater 122 can be associated with a software publisher without explicit reference to particular products of the publisher. The updater 122 can request and download information, instructions, and installers from the update server 110 for updating the software products 128. In one implementation, the updater 122 can also access information about the software and hardware environment of the update client 120. For example, the updater 122 can identify characteristics of processors, memory units, peripheral devices, the operating system, or software components, including the software products 128, that are installed in the update client 120.

The updater 122 includes update scripts 124. An update script is a list of instructions that the updater 122 can execute during an update process, e.g., during updating one or more of the software products 128. The update scripts 124 can include instructions in a high level programming language, such as Java or JavaScript, and to execute instructions in the high level programming language, the updater 122 can include an interpreter, such as Java Virtual Machines® ("JVM") developed by Sun Microsystems for interpreting instructions in Java. Alternatively, the updater 122 can include a compiler that translates instructions in the high level programming language into instructions in a low level programming language that can be executed by the update client 120. Methods for using the update scripts 124 for updating the software products 128 are discussed in more detail with reference to FIGS. 3-6.

The updater 122 can request and receive data that includes instructions for an update process. For example, the received data can include one or more scripts to be included in the update scripts 124. The updater 122 can request and receive one or more of the instructions 114 from the update server 110. Alternatively or in addition, the updater 122 can request and receive instructions from a local storage device. For example, the local storage device can store alternative scripts and the updater 122 can select one or more of the alternative scripts to include in the update scripts 124. In one implementation, the updater 122 can cache, i.e., locally store, frequently used scripts. In this implementation, the updater 122 can request the server to send only the scripts that have been changed at the server after a certain date, e.g., the date of caching the scripts. By caching scripts, the client can accelerate updates that are available from slow and/or remote sources.

Figure 2:
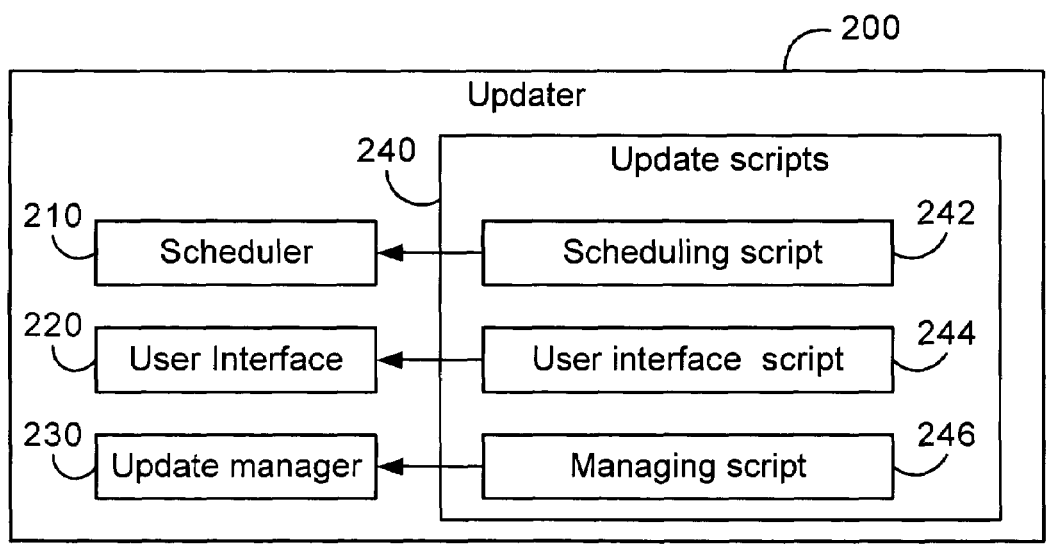
FIG. 2 is a schematic diagram showing an implementation of an updater.

FIG. 2 shows an updater 200 in one implementation of the invention. The updater 200 can be implemented in an update client, such as the update client 120 (FIG. 1), for requesting and installing updates. The updater 200 includes a scheduler 210, a user interface 220, an update manager 230, and update scripts 240. The update scripts 240 include a scheduling script 242 for the scheduler 210, a user interface script 244 for the user interface 220, and a managing script 246 for the update manager 230. In alternative implementations, one or more of the scripts 242-246 can be missing or combined, or the update scripts 240 can include additional scripts. For example, each of the scripts 242-246 can be implemented by multiple scripts. Furthermore, one or more of the scheduler, the user interface, and the update manager can be implemented exclusively by the corresponding scripts.

The scheduler 210 can be used to schedule one or more requests for update information from one or more update servers. For example, the scheduler 210 can schedule update requests periodically (e.g., every week), at a specific time (e.g., on a particular day of the year), relative to a specific event (e.g., after using a basic version of a software product for a predetermined amount of time), or according to a combination of these. The scheduler 210 executes instructions in the scheduling script 242 to decide when to request update information from an update server. For example, the scheduling script 242 can include instructions that are operable to specify scheduling parameters (such as a period, a date, or an event), and to verify, e.g., based on system information, if the updater 200 should request update information or not according to the scheduling parameters.

The user interface 220 can be used to communicate with a user during an update process. The user interface 220 can display information to a user, e.g., about the status of the update process, the update client, or the update server, and receive user input, e.g., information or a selection, that is used for the update process. For example, the user interface 220 can display a list of updates (and/or other software products) that are available from an update server and are suitable for the software and hardware environment of the update client, and the user can select which updates in the displayed list should be installed.

The user interface 220 executes instructions in the user interface script 244 to communicate with a user. The user interface script 244 can specify a layout for the user interface 220 and/or instructions that drive the user interface 220. For example, the user interface script 244 can include instructions and/or data specifying features of dialog boxes, windows, and/or other user interface elements that display information to and receive input from the user. The user interface script 244 can also implement logic to make decisions during communication with a user. For example, based on available updates or the received user input, instructions in the user interface script 244 can be used to select information to be displayed to the user or decide if additional user input is required.

The update manager 230 controls and monitors an update process. The update manager 230 can manage the update process according to the timing provided by the scheduler 210 and user input received by the user interface 220. For example, if the scheduler 210 indicates that it is time to request update information from an update server, the update manager 230 can contact (e.g., establish a communications link with) the update server and request any update information that is available; similarly, if the user interface 220 receives user input selecting an update, the update manager 230 can download and execute the installers for the selected update.

The update manager 230 executes instructions in the managing script 246 to manage an update process. In one implementation, the managing script 246 can include instructions for any function executed by the update manager 230. For example, instructions in the managing script can be used to specify how to identify and download data from an update server, how to interpret the downloaded data, or how to select, organize, and execute installers. Optionally, the managing script 246 can be implemented to include separate scripts for one or more steps of the update process. For example, the update information can be interpreted by a code script and other functions of the update manager can be implemented by a master script.

In addition, the update manager 230 can request and receive instructions, e.g., from an update server, and include the received instructions in the update scripts 240. For example, the received instructions can be used to modify, add to, delete from, or replace instructions in the update scripts 240. In one implementation, the update manager 230 can evaluate update information to identify instructions for the update process, download the identified instructions from an update server, and include the downloaded instructions in the update scripts 240. In one implementation, the update manager 230 can replace all scripts of the update scripts 240.

By modifying, adding to, replacing, or deleting instructions in the update scripts 240, the updater 200 can be customized, e.g., in response to update information received from an update server. The update server can provide customized instructions that can be identified, downloaded, and included in the update scripts 240 by the update manager 230. For example, the customized instructions can specify an update-specific update process or user interface. In addition, the customized instructions can schedule update requests to avoid periods of maintenance or high demand at the update server, or to synchronize update requests with a release of a new product. Furthermore, the customized instructions can customize a client to request update information from particular servers or to balance load of update servers. For example, the customized instructions can specify how to select an appropriate update server from multiple servers, or redirect the client to another server for available updates or other software products.

Figure 3:
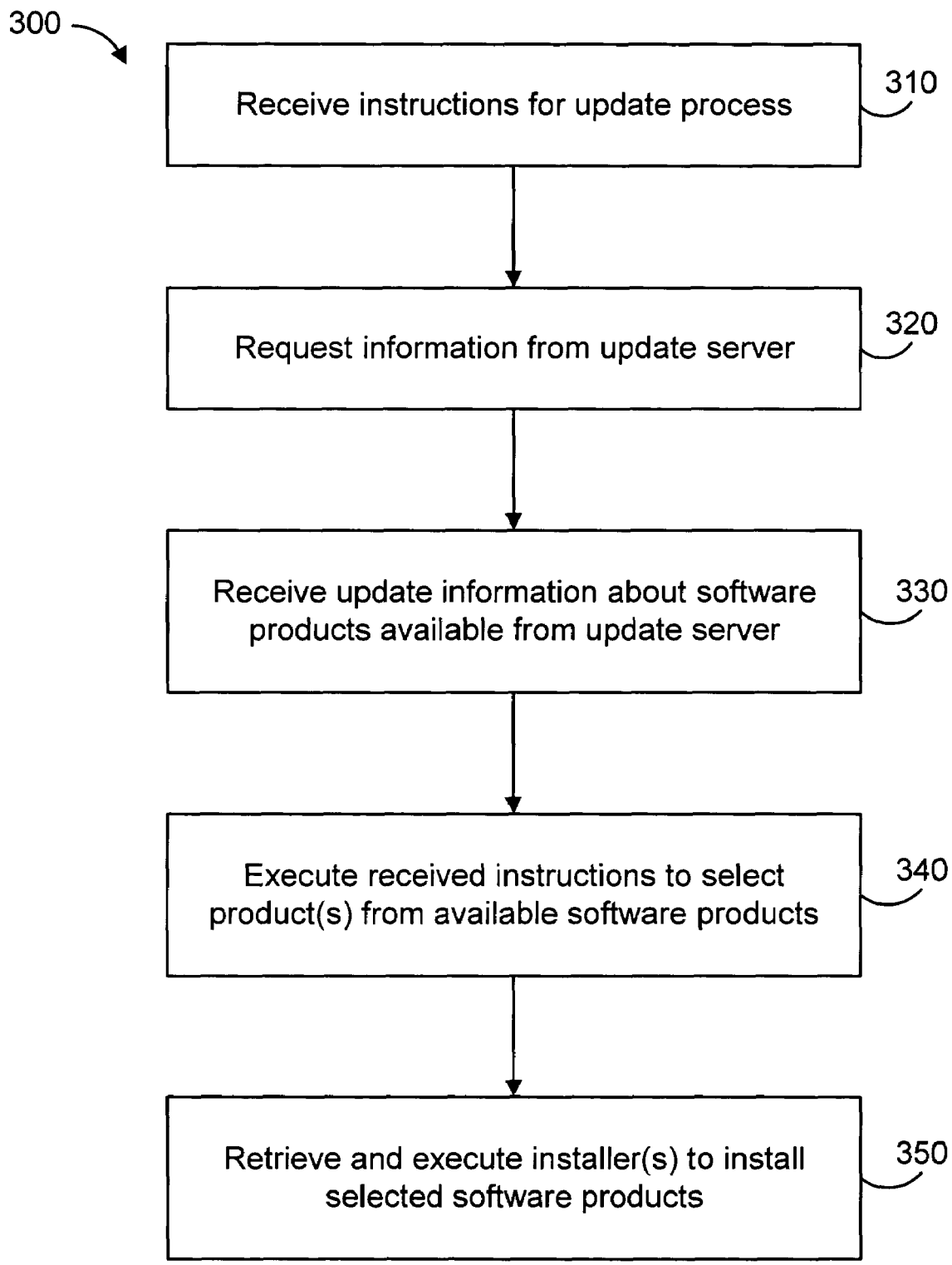
FIGS. 3-6 are schematic flow charts showing methods for updating software.

FIG. 3 shows a method 300 that can be performed by an update client, e.g., the update client 120 (FIG. 1), for updating software. The update client receives instructions for an update process (step 310). For example, the update client can include an updater, such as the updater 200 (FIG. 2), that can request and receive instructions from an update server, such as the update server 110 (FIG. 1). Alternatively, the instructions for the update process can be received from sources other than an update server. For example, the update client can receive the instructions from an application installing the updater or components of it. The received instructions can be executed by the update client. In one implementation, the received instructions are included in one or more update scripts (such as the update scripts 240) used by the updater.

The update client requests information from an update server (step 320) and receives update information about software products, e.g., updates, that are available from the update server (step 330). The update information can be received from the update server or from any other source, including user input or other computers in a computer network. As discussed above with reference to the update information 112 shown in FIG. 1, the update information identifies one or more updates and/or other software products that are available from the update server. For example, updates can be identified by version numbers and/or dates of last modification. The update information can characterize the available software products, e.g., by specifying hardware and software environments for the available software products. In addition, the update information can identify installers for the available software products. In alternative implementations, the update information can be received from the update server without explicit request by the update client. Requesting and receiving update information are further discussed with reference to FIG. 4.

Optionally, receiving instructions and update information can be combined or repeated during an update process. For example, the received update information can identify instructions for the update process. In this implementation, after receiving the update information, the identified instructions can be requested and received by the update client. Alternatively, the update client can receive instructions included in the update information or the update information can be specified by the received instructions.

The update client executes one or more of the received instructions to select one or more products from the available software products (step 340). The selection is based on the received update information and one or more selection criteria. The selection criteria can include system information—e.g., information collected (e.g., by the updater) about the software and/or hardware environment of the update client. The selection criteria can also include other criteria, such as user preferences. In one implementation, the update client first identifies software products, e.g., updates, that are suitable for the client environment. A software product is suitable for the client environment if the software product can be installed and/or operated in the client environment, and/or is preferred according to other criteria. For example, a user of the update client can preset criteria for identifying suitable updates (or other software products) for the client environment. From the suitable updates, the update client can select updates for installation based on input, such as user input. Alternatively, the update client can select updates for installation without user input, for example, based on input received from another computer application. Selecting software products, such as updates, is further discussed with reference to FIG. 5.

The update client retrieves, e.g., downloads, and executes installers to install the selected software products (step 350). The installers can be downloaded from the update server, e.g., one or more file servers, by the updater of the update client. In one implementation, the update client can identify the installers to install the selected software products, e.g., from the received update information. Optionally, the updater can execute one or more of the received instructions to identify, download, and execute installers. Installing software products, such as updates, is further discussed with reference to FIGS. 6 and 7.

Figure 4:
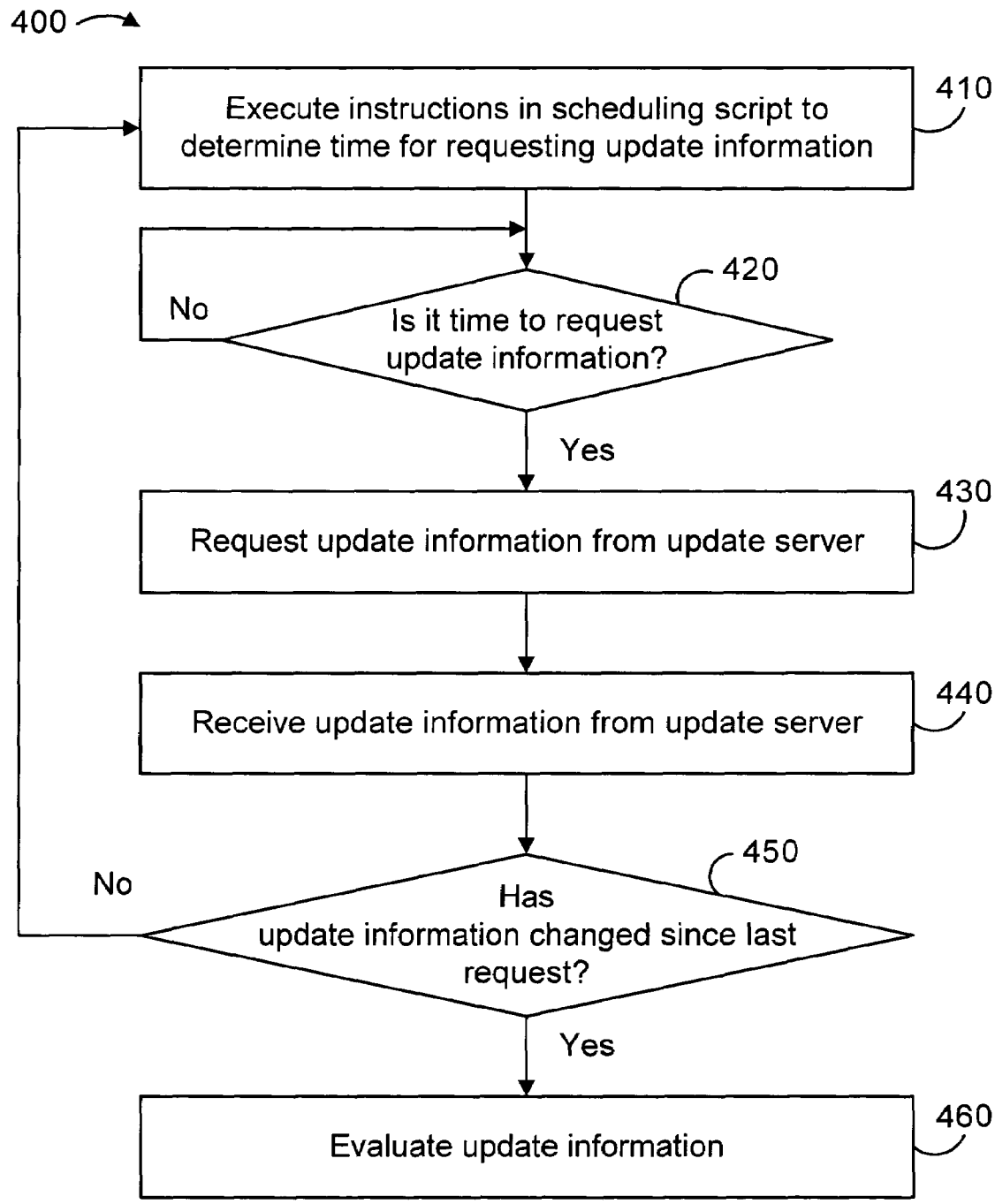

FIG. 4 shows a method 400 for receiving and evaluating update information. The method can be performed by an update client, such as the update client 120 (FIG. 1). For example, the update client can include an updater, such as the updater 200 (FIG. 2), that includes a scheduler (such as the scheduler 210) and corresponding update scripts (such as the scheduling script 242).

The updater executes one or more instructions of the scheduling script to determine a time for requesting update information (step 410). For example, the updater can execute the scheduling script to schedule one or more next update requests. The updater verifies whether it is time to request update information (decision 420). For example, the scheduling script can be executed periodically to decide if an update should be requested or not. Alternatively or in addition, the updater can be associated with an installed software product, and decide about requesting a update information each time the software product is used by a user. If the update information should not be requested ("No" branch of decision 420), the updater returns to deciding about the request at a later time.

If the update should be requested ("Yes" branch of decision 420), the updater requests update information from an update server (step 430). Optionally, update information can be requested at any time, e.g., as directed by user input. The updater can execute one or more instructions in the update scripts to request the update information. For example, an update script can specify address and identifiers for requesting the update information from the update server.

The updater receives the requested update information from the update server (step 440), and determines whether the update information has changed since the last request (decision 450). For example, the updater can store a latest version of update information from an update server, and compare the received update information with the latest version. Alternatively, the received update information can indicate a time of its last modification, and the indicated time can be compared to a time when update information was last received from the update server. If the update information has not changed ("No" branch of decision 450), the updater can return to determine a next time to request update information (i.e., step 410). If the update information has changed ("Yes branch of decision 450), the updater evaluates the received update information (step 460).

In alternative implementations, the updater can specify a date, e.g., the date when update information was most recently retrieved, and requests an update server to send update information that has changed since the specified date. In such implementations, instead of determining whether the update information has changed (i.e., decision 450), the updater can verify whether the requested update information has been received.

Figure 5:
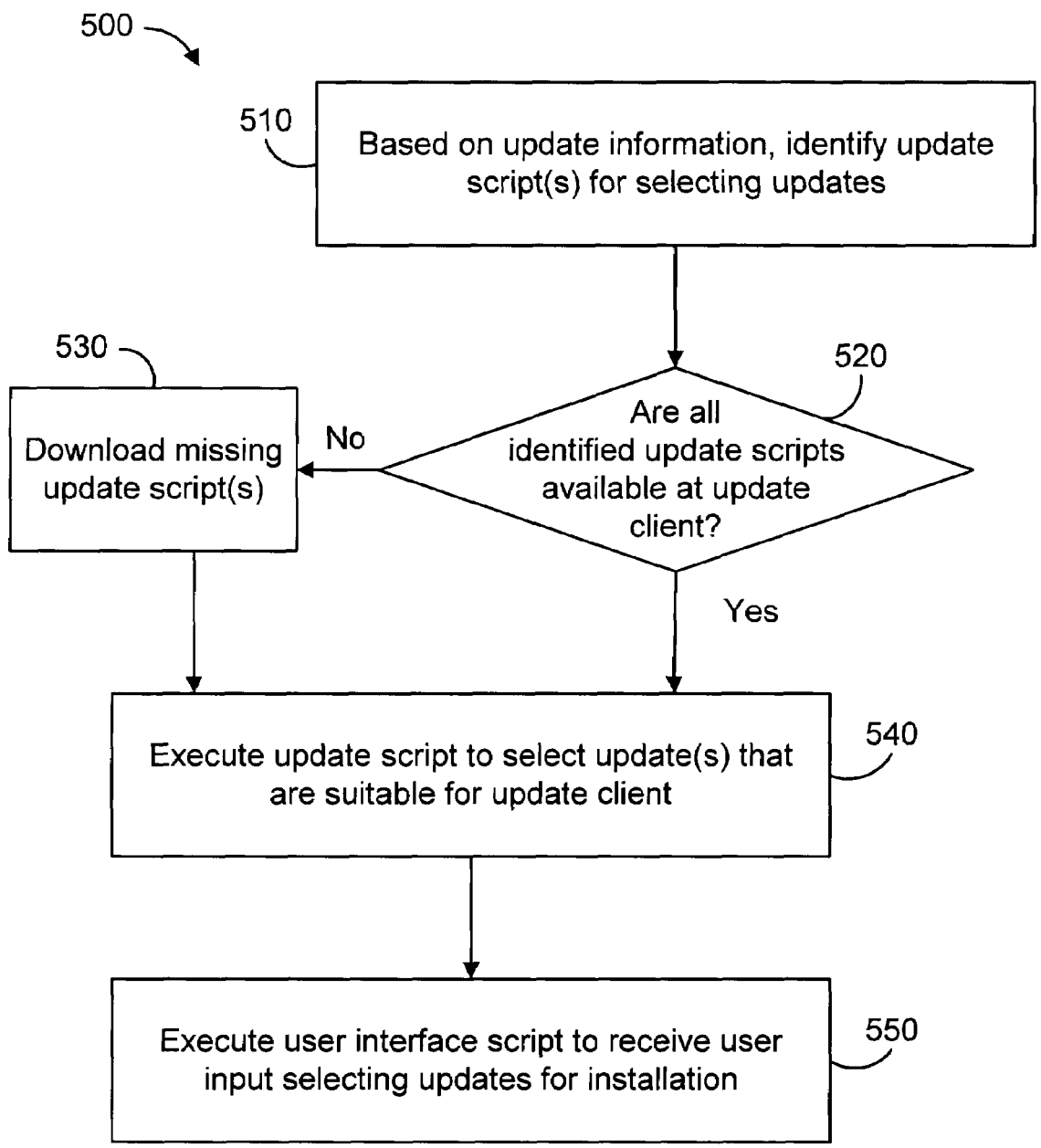

FIG. 5 shows a method 500 for evaluating update information and selecting updates based on the evaluation. The update information identifies updates that can be received from an update server. (Alternatively or in addition to updates, the method 500 can be used to select other software products.) The method 500 can be performed by an update client that includes an updater using update scripts (e.g., the updater 200 in FIG. 2).

Based on the update information, the updater identifies update scripts for selecting updates (step 510). In one implementation, the updater evaluates the update information and identifies all scripts that are indicated by the update information for an update process. Alternatively, the updater can identify only those scripts that can be used for selecting updates from the update server. For example, the updater can identify only user interface scripts and update managing scripts operable to collect and evaluate system information of the update client. Identifying update scripts can include executing one or more instructions in the update scripts that are already included in the updater.

The updater determines whether all identified update scripts are available at the update client (decision 520). If there are update scripts that are not available at the update client ("No" branch of decision 520), the updater downloads the missing update scripts (step 530). For example, the missing update scripts can be downloaded to the update client from the update server. The downloading can include executing one or more instructions in the update information and/or in the update scripts of the updater.

When all identified update scripts are available at the update client ("Yes" branch of decision 520 and from step 530), the updater executes one or more instructions of update scripts to select updates that are suitable for the update client (step 540). In one implementation, an update is suitable if the update client can support installing the update and/or operating the corresponding updated software product. Alternatively or in addition, suitable updates can be selected based on other criteria, such as user preference. Selecting suitable updates can include evaluating the update information to identify updates that are available from the update server and collecting and evaluating system information (including software and hardware) of the update client. For example, the updater can select suitable updates from the available updates based on the evaluated system information. Optionally, the updater can select only updates that are not yet installed in the update client. Installed updates can be identified, for example, from the system information.

The updater executes one or more instructions of the user interface script to receive user input selecting updates for installation (step 550). In one implementation, the user interface displays a list including the updates that are suitable for the update client, and from the list, the user can select one or more updates for installation. Optionally, the user interface script can evaluate the update information to collect additional information about the updates in the list and display the additional information to the user. Collecting additional information can include downloading the additional information from the update server.

Figure 6:
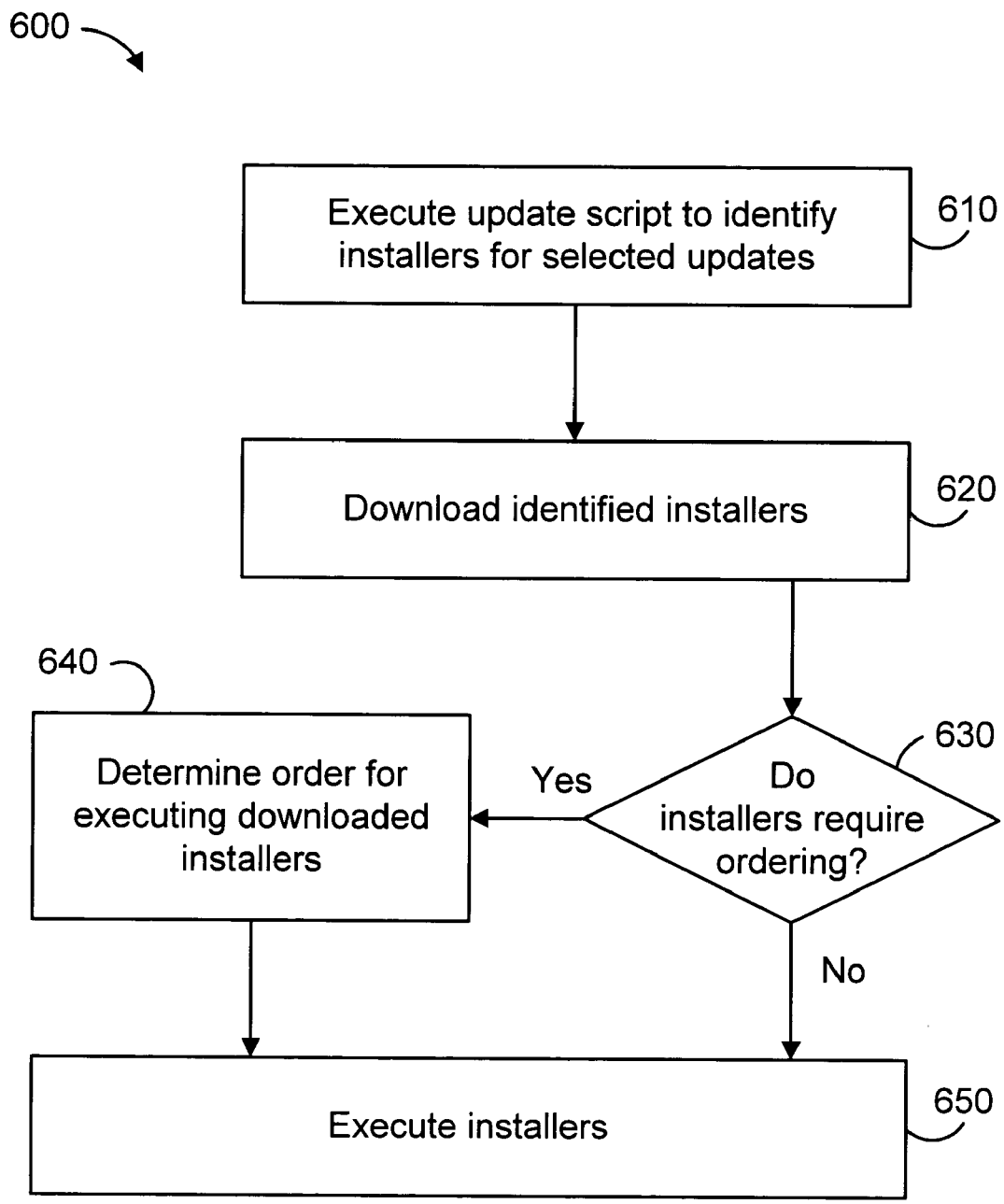

FIG. 6 shows a method 600 for installing updates selected for installation in an update client. The updates can be selected, e.g., by the update client using the method 500 (FIG. 5). (Alternatively or in addition to updates, the method 600 can be used to install other software products.) The method 600 can be performed by the update client, such as the update client 120 (FIG. 1), that includes update scripts. The update scripts can include one or more instructions received, e.g., from an update server.

The update client executes one or more instructions in the update scripts to identify installers for the updates selected for installation (step 610). In one implementation, the installers are identified from update information received from an update server. Alternatively or in addition, the installers can be identified based on user input received, for example, in a user interface that is specified using one or more instructions in the update scripts. In alternative implementations, the installers can be identified by the update server based on a request from the update client.

The identified installers are downloaded (step 620). For example, the update client can include an updater that is operable to download installers from update servers. Information for the downloading can be obtained by evaluating update information received from the corresponding update server. Optionally, the installers can be downloaded from more than one server. For example, information from a first server can identify a second server where installers are available. In one implementation, the updater executes one or more instructions in the update scripts for downloading the identified installers. For example, the instructions can be executed to select an update server from multiple update servers.

The update client determines whether the downloaded installers require ordering (decision 630). In some implementations, the downloaded installers can include a sequence of installers that properly install an update only if they are executed in a particular order. An example of such implementation is discussed with reference to FIG. 7. If ordering is required ("Yes" branch of decision 630), the update client determines the order for executing the downloaded installers (step 640). The order can be determined, e.g., by evaluating update information received from the update server. In one implementation, determining the order includes executing one or more instructions in the update scripts.

After determining the order (step 640), or if ordering is not required ("No" branch of decision 630), the installers are executed (step 650). If ordering is required, the installers are executed according to the determined order. If no order is explicitly determined, the installers can be executed in an arbitrary order, e.g., the order in which the installers have been downloaded, or even in parallel.

In alternative implementations, determining an order for execution and executing the installers can be combined. For example, the update client can execute a first installer before determining which installer is executed next. Optionally, the next installer can be selected based on a result of executing the first installer, and the update client can execute one or more instructions in the update scripts to make the selection.

Figure 7:
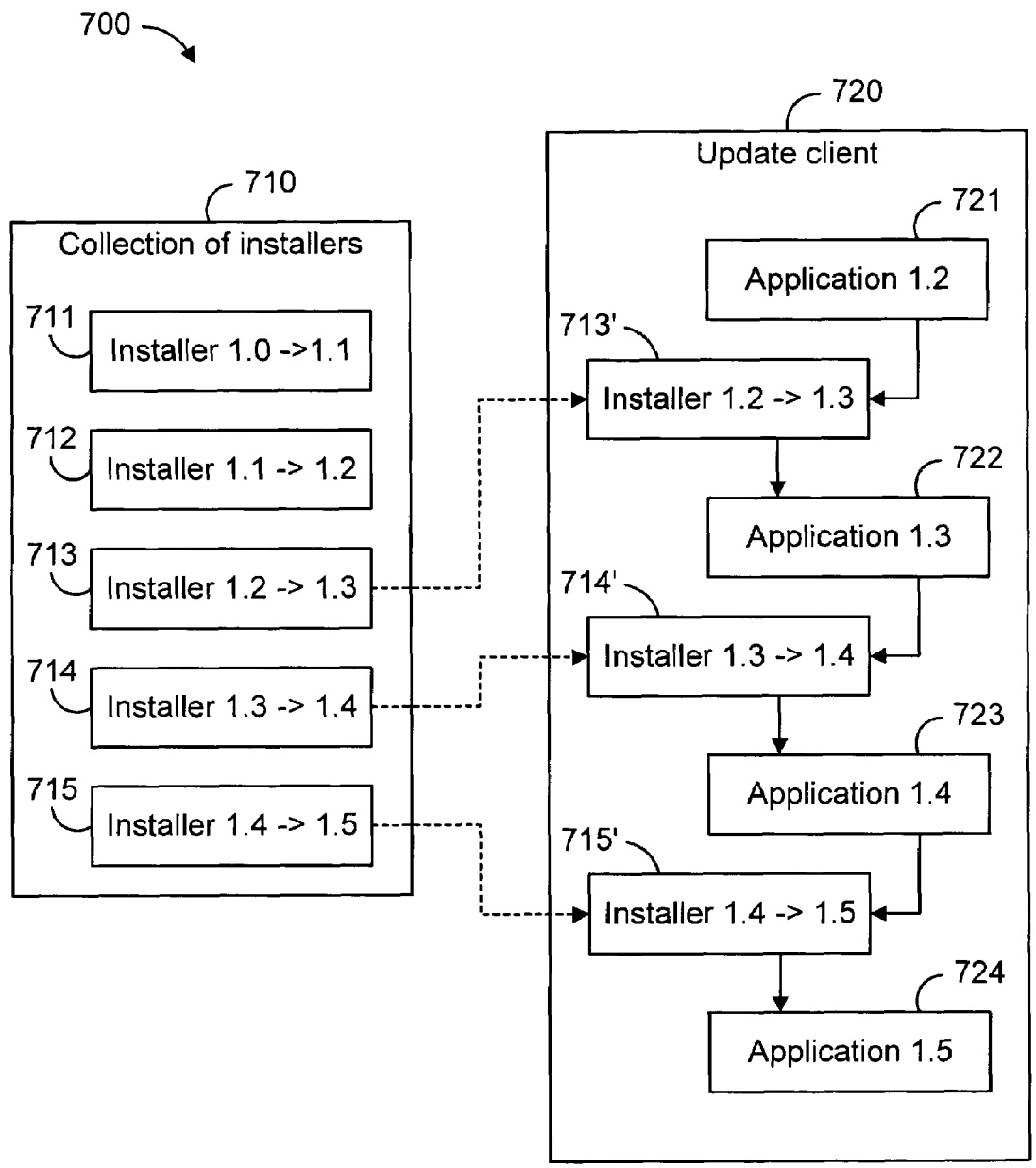
FIG. 7 is a schematic diagram illustrating an exemplary implementation of using a sequence of installers to update software.

FIG. 7 illustrates an exemplary system 700 for using a sequence of installers to update a software application. The system 700 includes a collection 710 of installers and an update client 720. The collection 710 of installers can be included, e.g., in an update server that provides updates to the update client 720. The collection 710 of installers includes installers 711-715. Each of the installers 711-715 can be used to update a particular version of a software application to a next version: installer 711 updates version 1.0 to 1.1; installer 712 updates version 1.1 to 1.2; installer 713 updates version 1.2 to 1.3; installer 714 updates version 1.3 to 1.4; installer 715 updates version 1.4 to 1.5.

The update client 720 includes a version 1.2 (721) of the software application, which can be updated using the installers in the collection 710. The update client 720 can include update scripts that can be executed to select and download installers from the collection 710. In the example shown in FIG. 7, the update client 720 has selected and downloaded installers 713, 714, and 715 from the collection 710. The downloaded installers (713', 714', and 715', respectively) are executed by the update client 720 to update the version 1.2 of the application to version 1.5.

In one implementation, the update client includes update scripts that are received from the update server. The update scripts include instructions that specify an order of execution for installers in the collection 710. By executing the instructions specifying the order of execution, the update client 720 can first execute the installer 713' for updating the version 1.2 of the application to version 1.3. Next, by executing the installer 714', the version 1.3 is updated to version 1.4. Finally, the update client 720 can update the software application to version 1.5 by executing the installer 715'.

Because the update client can use a series of installers to update the application from version 1.2 to version 1.5, the update server is not required to provide an installer for updating all previous versions to the newest version. Neither is the update server required to monitor the update process, because the update client can receive and execute all necessary instructions to monitor the update process.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A computer-implemented method for updating software in a client environment, the client environment including an updater application, the method comprising:
    receiving update information from a stateless update server as part of an update process performed by the updater application in the client environment, the update information identifying one or more available software products, the update information including update instructions, wherein:
        the update server does not receive or evaluate information about the client environment, does not make decisions regarding the update process on the client environment, and does not control or monitor the update process on the client environment, and
        the update instructions consist entirely of platform-independent instructions for the updater application, the update instructions comprising scheduling instructions that the updater application executes to schedule one or more requests for update information from one or more update servers, user interface instructions that the updater application executes to communicate with a user of the updater application, and manager instructions that the updater application executes to manage the update process;
    storing the received update instructions to supersede any previously received update instructions; and
    executing the received update instructions in the updater application to manage a software update process to schedule a first request for update information, to interact with the user to identify a first software product, and to retrieve and install the first software product in the client environment.

2. The method of claim 1, wherein:
    executing update instructions in the client environment to identify the first software products includes executing instructions to evaluate the client environment.

3. The method of claim 2, wherein:
    evaluating the client environment includes identifying software or hardware installed in the client environment.

4. The method of claim 2, further comprising:
    determining in the client environment when to request update information.

5. The method of claim 4, wherein:
    the update instructions include scheduling instructions; and
    determining in the client environment when to request update information includes executing one or more of the scheduling instructions.

6. The method of claim 2, wherein:
executing update instructions to identify the first software products includes executing instructions to interpret the update information identifying the available software products.

7. The method of claim 6, wherein:
interpreting the update information includes determining whether new update instructions are required for processing the available software products; and
if new update instructions are required, identifying suitable software products includes retrieving and executing the new update instructions in the client environment.

8. The method of claim 2, further comprising:
receiving an input selecting the first software products including receiving user input selecting the first software product.

9. The method of claim 2, wherein:
the available software products include one or more available software updates; and
executing update instructions in the client environment to identify the first software product includes executing update instructions to identify one or more of the available software updates as suitable for software in the client environment.

10. The method of claim 9, wherein:
receiving update information in the client environment includes receiving information indicating a version number and/or dates of last modification of each available software update.

11. The method of claim 9, wherein:
executing update instructions to identify suitable updates includes executing instructions to identify updates of a software product installed in the client environment.

12. The method of claim 11, wherein:
executing the instructions to identify updates of the installed software product includes executing instructions to identify updates that add optional components to the installed software product.

13. The method of claim 11, wherein:
the installed software product has a first version number; and
executing the instructions to identify updates of the installed software product includes executing instructions to identify updates that are operable to update the installed software product from the first to a second version number.

14. The method of claim 9, wherein:
the update instructions are executed in the client environment by the updater application, the updater application being associated with one or more software products installed in the client environment; and
executing update instructions to identify suitable updates includes executing update instructions to identify suitable updates that are unrelated to the software products associated with the updater application.

15. The method of claim 9, wherein:
executing the received update instructions includes identifying installers for the selected software updates and retrieving the identified installers; and further comprising:
using the retrieved installers to install the received update instructions.

16. The method of claim 15, wherein:
executing the received update instructions to identify installers includes executing instructions to identify a sequence of two or more installers for updating a software product; and
using the retrieved installers includes executing the two or more installer applications for updating the software product in an order defined by the identified sequence.

17. The method of claim 16, wherein:
executing the received update instructions to identify installers includes executing instructions to identify dependencies between installer applications for updating the software product.

18. The method of claim 2, wherein:
executing update instructions to identify suitable software products includes executing instructions to specify a user interface for updating software in the client environment.

19. The method of claim 18, further comprising:
presenting a representation of at least a portion of the update information to a user in the specified user interface.

20. The method of claim 2, wherein:
retrieving the selected first software product includes retrieving the selected first software products as digitally signed data.

21. The method of claim 1, wherein:
receiving update information includes receiving update instructions as digitally signed data.

22. The method of claim 2, further comprising:
caching the update instructions.

23. The method of claim 2, wherein:
the update instructions are specified in an interpreted computer language.

24. The method of claim 23, wherein:
the interpreted computer language is JavaScript or VBScript.

25. A computer-implemented method for updating software in a client environment, the client environment including an updater application configured to update software, the method comprising:
using the updater application to access information in and about the client environment, the information including information about the client environment hardware and software;
using the updater application to access and download one or more platform-independent software updates from a stateless server, where the updates being accessed and downloaded are based on the information about the client environment hardware and software, and where the stateless server does not receive or evaluate information about the client environment, does not make decisions regarding the update process on the client environment, and does not control or monitor the update process on the client environment;
using the updater application to receive one or more platform-independent software updates for one or more software products in the client environment;
using the updater application to download one or more installer applications in the client environment; and
using the updater application to execute the one or more installer applications in an order defined by a sequence to update the one or more software products using the one or more platform-independent software updates, the one or more software products being updated from an earlier version through one or more intermediate versions to a new version in the client environment.

26. A software product, tangibly embodied in a machine-readable storage medium, for updating software in a client environment including an updater application, the software product comprising instructions operable to cause one or more data processing apparatus to perform operations comprising:

receiving update information from a stateless update server as part of an update process performed by the updater application in the client environment, the update information identifying one or more available software products, the update information including update instructions, wherein:

the update server does not receive or evaluate information about the client environment, does not make decisions regarding the update process on the client environment, and does not control or monitor the update process on the client environment, and the update instructions consist entirely of platform-independent instructions for the updater application, the update instructions comprising scheduling instructions that the updater application executes to schedule one or more requests for update information from one or more update servers, user interface instructions that the updater application executes to communicate with a user of the updater application, and manager instructions that the updater application executes to manage the update process;

storing the received update instructions to supersede any previously received update instructions; and executing the received update instructions in the updater application to manage a software update process to schedule a first request for update information, to interact with the user to identify a first software product, and to retrieve and install the first software product in the client environment.

27. The software product of claim 26, wherein:
executing update instructions in the client environment to identify the first software products includes executing instructions to evaluate the client environment.

28. The software product of claim 27, wherein:
evaluating the client environment includes identifying software or hardware installed in the client environment.

29. The software product of claim 27, further comprising instructions operable to cause one or more data processing apparatus to perform operations comprising:
determining in the client environment when to request update information.

30. The software product of claim 29, wherein:
the update instructions include scheduling instructions; and
determining in the client environment when to request update information includes executing one or more of the scheduling instructions.

31. The software product of claim 27, wherein:
executing update instructions to identify the first software product includes executing instructions to interpret the update information identifying the available software products.

32. The software product of claim 31, wherein:
interpreting the update information includes determining whether new update instructions are required for processing the available software products; and
if new update instructions are required, identifying suitable software products includes retrieving and executing the new update instructions in the client environment.

33. The software product of claim 27, further comprising:
receiving an input selecting the first software product including receiving user input selecting the first software product.

34. The software product of claim 27, wherein:
the available software products include one or more available software updates; and
executing update instructions in the client environment to identify the first software product includes executing update instructions to identify one or more of the available software updates as suitable for software in the client environment.

35. The software product of claim 34, wherein:
receiving update information in the client environment includes receiving information indicating a version number and/or dates of last modification of each available software update.

36. The software product of claim 34, wherein:
executing update instructions to identify suitable updates includes executing instructions to identify updates of a software product installed in the client environment.

37. The software product of claim 36, wherein:
executing the instructions to identify updates of the installed software product includes executing instructions to identify updates that add optional components to the installed software product.

38. The software product of claim 36, wherein:
the installed software product has a first version number; and
executing the instructions to identify updates of the installed software product includes executing instructions to identify updates that are operable to update the installed software product from the first to a second version number.

39. The software product of claim 36, wherein:
the update instructions are executed in the client environment by the updater application, the updater application being associated with one or more software products installed in the client environment; and
executing update instructions to identify suitable updates includes executing update instructions to identify suitable updates that are unrelated to the software products associated with the updater application.

40. The software product of claim 34, wherein:
executing the received update instructions includes identifying installers for the selected software updates and retrieving the identified installers; and further comprising:
using the retrieved installers to install the received update instructions.

41. The software product of claim 40, wherein:
executing the received update instructions to identify installers includes executing instructions to identify a sequence of two or more installers for updating a software product; and
using the retrieved installers includes executing the two or more installer applications for updating the software product in an order defined by the identified sequence.

42. The software product of claim 41, wherein:
executing the received update instructions to identify installers includes executing instructions to identify dependencies between installer applications for updating the software product.

43. The software product of claim 27, wherein:
executing update instructions to identify suitable software products includes executing instructions to specify a user interface for updating software in the client environment.

44. The software product of claim 43, further comprising instructions operable to cause one or more data processing apparatus to perform operations comprising:

presenting a representation of at least a portion of the update information to a user in the specified user interface.

45. The software product of claim 27, wherein:
retrieving the selected first software products includes retrieving the selected first software products as digitally signed data.

46. The software product of claim 26, wherein:
receiving update information includes receiving update instructions as digitally signed data.

47. The software product of claim 27, further comprising instructions operable to cause one or more data processing apparatus to perform operations comprising:
caching the update instructions.

48. The software product of claim 27, wherein:
the update instructions are specified in an interpreted computer language.

49. The software product of claim 48, wherein:
the interpreted computer language is JavaScript or VBScript.

50. A software product, tangibly embodied in a machine-readable storage medium, for updating software in a client environment including an updater application configured to update software, the software product comprising instructions operable to cause one or more data processing apparatus to perform operations comprising:
using the updater application to access information in and about the client environment, the information including information about the client environment hardware and software;
using the updater application to access and download one or more platform-independent software updates from a stateless server, where the updates being accessed and downloaded are based on the information about the client environment hardware and software, and where the stateless server does not receive or evaluate information about the client environment, does not make decisions regarding the update process on the client environment, and does not control or monitor the update process on the client environment;
using the updater application to receive one or more platform-independent software updates for one or more software products in the client environment;
using the updater application to download one or more installer applications in the client environment; and
using the updater application to execute the one or more installer applications in an order defined by a sequence to update the one or more software products using the one or more platform-independent software updates, the one or more software products being updated from an earlier version through one or more intermediate versions to a new version in the client environment.

51. A system comprising:
a processor;
memory storing a computer program product for updating software in a client environment including an updater application, the computer program product including instructions to cause the processor to:
receive update information from a stateless update server as part of an update process performed by the updater application in the client environment, the update information identifying one or more available software products, the update information including update instructions, wherein:
the update server does not receive or evaluate information about the client environment, does not make decisions regarding the update process on the client environment, and does not control or monitor the update process on the client environment, and
the update instructions consist entirely of platform-independent instructions for the updater application, the update instructions comprising scheduling instructions that the updater application executes to schedule one or more requests for update information from one or more update servers, user interface instructions that the updater application executes to communicate with a user of the updater application, and manager instructions that the updater application executes to manage the update process;
store the received update instructions to supersede any previously received update instructions; and
execute the received update instructions in the updater application to manage a software update process to schedule a first request for update information, to interact with the user to identify a first software product, and to retrieve and install the first software product in the client environment.

52. The system of claim 51, wherein:
instructions to cause the processor to execute update instructions in the client environment to identify the first software product include instructions to cause the processor to execute update instructions to evaluate the client environment.

53. The system of claim 52, wherein:
instructions to cause the processor to evaluate the client environment include instructions to cause the processor to identify software or hardware installed in the client environment.

54. The system of claim 52, wherein the computer program product further includes instructions to cause the processor to:
determine in the client environment when to request update information.

55. The system of claim 54, wherein:
the update instructions include scheduling instructions; and
instructions to cause the processor to determine in the client environment when to request update information include instructions to cause the processor to execute one or more of the scheduling instructions.

56. The system of claim 52, wherein:
instructions to cause the processor to execute update instructions to identify the first software product include instructions to cause the processor to execute update instructions to interpret the update information identifying the available software products.

57. The system of claim 56, wherein:
instructions to cause the processor to interpret the update information include instructions to cause the processor to determine whether new update instructions are required for processing the available software products; and
if new update instructions are required, instructions to cause the processor to identify suitable software products include instructions to cause the processor to retrieve and execute the new update instructions in the client environment.

58. The system of claim 52, further comprising:
instructions to cause the processor to receive an input selecting the first software product including instructions to cause the processor to receive user input selecting the first software product.

59. The system of claim 52, wherein:

the available software products include one or more available software updates; and instructions that cause the processor to execute update instructions in the client environment to identify the first software product include instructions to cause the processor to execute update instructions to identify one or more of the available software updates as suitable for software in the client environment.

60. The system of claim 59, wherein:

instructions to cause the processor to receive update information in the client environment include instructions to cause the processor to receive update information indicating a version number and/or dates of last modification of each available software update.

61. The system of claim 59, wherein:

instructions to cause the processor to execute update instructions to identify suitable updates include instructions to cause the processor to execute update instructions to identify updates of a software product installed in the client environment.

62. The system of claim 61, wherein:

instructions to cause the processor to execute the update instructions to identify updates of the installed software product include instructions to cause the processor to execute update instructions to identify updates that add optional components to the installed software product.

63. The system of claim 61, wherein:

the installed software product has a first version number; and instructions to cause the processor to execute the update instructions to identify updates of the installed software product include instructions to cause the processor to execute instructions to identify updates that are operable to update the installed software product from the first to a second version number.

64. The system of claim 59, wherein:

the update instructions are executed in the client environment by the updater application, the updater application being associated with one or more software products installed in the client environment; and instructions to cause the processor to execute update instructions to identify suitable updates include instructions to cause the processor to execute update instructions to identify suitable updates that are unrelated to the software products associated with the updater application.

65. The system of claim 59, wherein:

instructions to cause the processor to execute the received update instructions includes identifying installers for the selected software updates and retrieving the identified installers; and further comprising instructions to:

use the retrieved installers to install the received update instructions.

66. The system of claim 65, wherein:

instructions to cause the processor to execute the received update instructions to identify installers include instructions to cause the processor to execute update instructions to identify a sequence of two or more installers for updating a software product; and instructions to cause the processor to use the retrieved installers include instructions to cause the processor to execute the two or more installer applications for updating the software product in an order defined by the identified sequence.

67. The system of claim 66, wherein:

instructions to cause the processor to execute the received update instructions to identify installers include instructions to cause the processor to execute update instructions to identify dependencies between installer applications for updating the software product.

68. The system of claim 52, wherein:

instructions to cause the processor to execute update instructions to identify suitable software products include instructions to cause the processor to execute update instructions to specify a user interface for updating software in the client environment.

69. The system of claim 68, wherein the computer program product further includes:

instructions to cause the processor to present a representation of at least a portion of the update information to a user in the specified user interface.

70. The system of claim 52, wherein:

instructions to cause the processor to retrieve the selected first software products include instructions to cause the processor to retrieve the selected first software products as digitally signed data.

71. The system of claim 51, wherein:

instructions to cause the processor to receive update information include instructions to cause the processor to receive update instructions as digitally signed data.

72. The system of claim 52, wherein the computer program further includes:

instructions to cause the processor to cache the update instructions.

73. A system comprising:

a processor;

memory comprising a computer program product for updating software in a client environment including an updater application configured to update software, the computer program product including instructions to cause the processor to:

use the updater application to access information in and about the client environment, the information including information about the client environment hardware and software;

use the updater application to access and download one or more platform-independent software updates from a stateless server, where the updates being accessed and downloaded are based on the information about the client environment hardware and software, and where the stateless server does not receive or evaluate information about the client environment, does not make decisions regarding the update process on the client environment, and does not control or monitor the update process on the client environment;

use the updater application to receive one or more platform-independent software updates for one or more software products in the client environment;

use the updater application to download one or more installer applications in the client environment; and use the updater application to execute the one or more installer applications in an order defined by a sequence to update the one or more software products using the one or more platform-independent software updates, the one or more software products being updated from an earlier version through one or more intermediate versions to a new version in the client environment.

* * * * *

UNITED STATES PATENT AND TRADEMARK OFFICE
CERTIFICATE OF CORRECTION

| | | |
|---|---|---|
| PATENT NO. | : 7,620,948 B1 | Page 1 of 1 |
| APPLICATION NO. | : 10/651697 | |
| DATED | : November 17, 2009 | |
| INVENTOR(S) | : Rowe et al. | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 570 days Delete the phrase "by 570 days" and insert -- by 910 days --

Signed and Sealed this

Third Day of August, 2010

David J. Kappos
*Director of the United States Patent and Trademark Office*